(12) United States Patent
Winkel et al.

(10) Patent No.: US 12,135,544 B2
(45) Date of Patent: Nov. 5, 2024

(54) CNC ADD-ON SENSOR SYSTEM AND METHOD FOR REAL-TIME DETECTION OF TOOL ANOMALIES

(71) Applicant: Worldwide Superabrasives, LLC, Boynton Beach, FL (US)

(72) Inventors: Chris Winkel, Boynton Beach, FL (US); Andreas Planakis, Boynton Beach, FL (US)

(73) Assignee: Worldwide Superabrasives, LLC, Boynton Beach, FL (US)

( * ) Notice: Subject to any disclaimer, the term of this patent is extended or adjusted under 35 U.S.C. 154(b) by 0 days.

(21) Appl. No.: 17/501,567

(22) Filed: Oct. 14, 2021

(65) Prior Publication Data

US 2023/0118552 A1    Apr. 20, 2023

(51) Int. Cl.
*G05B 23/02*    (2006.01)
*G05B 19/414*   (2006.01)
*G05B 19/418*   (2006.01)

(52) U.S. Cl.
CPC ..... *G05B 23/0272* (2013.01); *G05B 19/4145* (2013.01); *G05B 19/4183* (2013.01); *G05B 19/4185* (2013.01)

(58) Field of Classification Search
None
See application file for complete search history.

(56) References Cited

U.S. PATENT DOCUMENTS

| | | | |
|---|---|---|---|
| 7,245,982 B2 | 7/2007 | Morfino | |
| 7,536,237 B2 | 5/2009 | Esterling | |

(Continued)

FOREIGN PATENT DOCUMENTS

| | | |
|---|---|---|
| CN | 1258431 C | 6/2006 |
| CN | 101571712 A | 11/2009 |

(Continued)

OTHER PUBLICATIONS

Sathyapriya et al., "Data Acquisition System of 8-Channel Temperature Scanner using Power Line Carrier Communication", International Journal of Advanced Research in Computer and Communication Engineering 2014 (Year: 2014).*

(Continued)

*Primary Examiner* — Carlos R Ortiz Rodriguez
(74) *Attorney, Agent, or Firm* — Geoffrey Lottenberg; Berger Singerman LLP

(57) ABSTRACT

A system and method for determining the operating conditions a machining operation includes a sensor array, a data acquisition system, and a computing device. The sensor array includes one or more sensors, such as a power, force, acoustic, fluid, or displacement sensor, configured to detect certain operational characteristics of the machining operating and machining tool. The sensor array is coupled to a computing device via a data acquisition system. The computing device runs software that outputs in human-readable format sensor data generated by the data acquisition system. The user can thereby detect anomalies in the machining operating, including errors or poor tolerances with the machining tool, such as a grinding of polishing wheel. The computing device can also send feedback signals to the machining tool to address detected anomalies. The computer software is configured to output up to eight (8) channels of data received from the sensor array.

10 Claims, 4 Drawing Sheets

(56) References Cited

U.S. PATENT DOCUMENTS

| | | | |
|---|---|---|---|
| 7,797,062 B2 * | 9/2010 | Discenzo | ............... H04L 67/12 |
| | | | 700/20 |
| 9,440,328 B2 | 9/2016 | Ribbeck | |
| 2014/0262392 A1 | 9/2014 | Petrossians et al. | |
| 2018/0272491 A1 | 9/2018 | Yang et al. | |
| 2019/0011327 A1 | 1/2019 | Phommasith | |
| 2019/0121315 A1 | 4/2019 | Owens | |

FOREIGN PATENT DOCUMENTS

| | | | |
|---|---|---|---|
| CN | 102785129 B | 8/2016 | |
| EP | 2871547 B1 | 8/2020 | |
| IN | 101477351 B | 11/2010 | |
| WO | 2016131021 A1 | 8/2016 | |

OTHER PUBLICATIONS

Hillaire et al., "A Process Monitoring System for Process-Based Product Validation", Journal of Manufacturing Processes 2005 (Year: 2005).*

Karpuschewski, B., M. Wehmeier, and I. Inasaki. "Grinding monitoring system based on power and acoustic emission sensors." CIRP Annals 49.1 (2000): 235-240. (Year: 2000).*

Wehmeier, M., and I. Inasaki. "Investigation and utilization of the acoustic emission signal for monitoring the dressing process." Proceedings of the Institution of Mechanical Engineers, Part B: Journal of Engineering Manufacture 216.4 (2002): 543-553. (Year: 2002).*

Dr. Chen XiaoQi et al.; SIMTech Technical Report (AT/01/014/AMP); "In-Process Tool Monitoring through Acoustic Emission Sensing"; 2001; 8 pages.

* cited by examiner

CNC ADD-ON SENSOR SYSTEM AND METHOD FOR REAL-TIME DETECTION OF TOOL ANOMALIES

FIELD OF INVENTION

The present invention generally relates to the real-time sensing and measurement of anomalies that affect machining, grinding, and wheel-dressing operations in the context of grinding, polishing, milling, and cutting machines, for example computer-numerical-control ("CNC") machines.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings, given below, explain the principles of the disclosure.

In the drawings:

FIG. 1 is a schematic of the data capturing and measurement system, in an embodiment.

FIG. 2 is an example output graph demonstrating multi-parameter review of a machining operation.

FIG. 3 is an example output graph demonstrating single parameter control of a machining operation.

Figure 1:
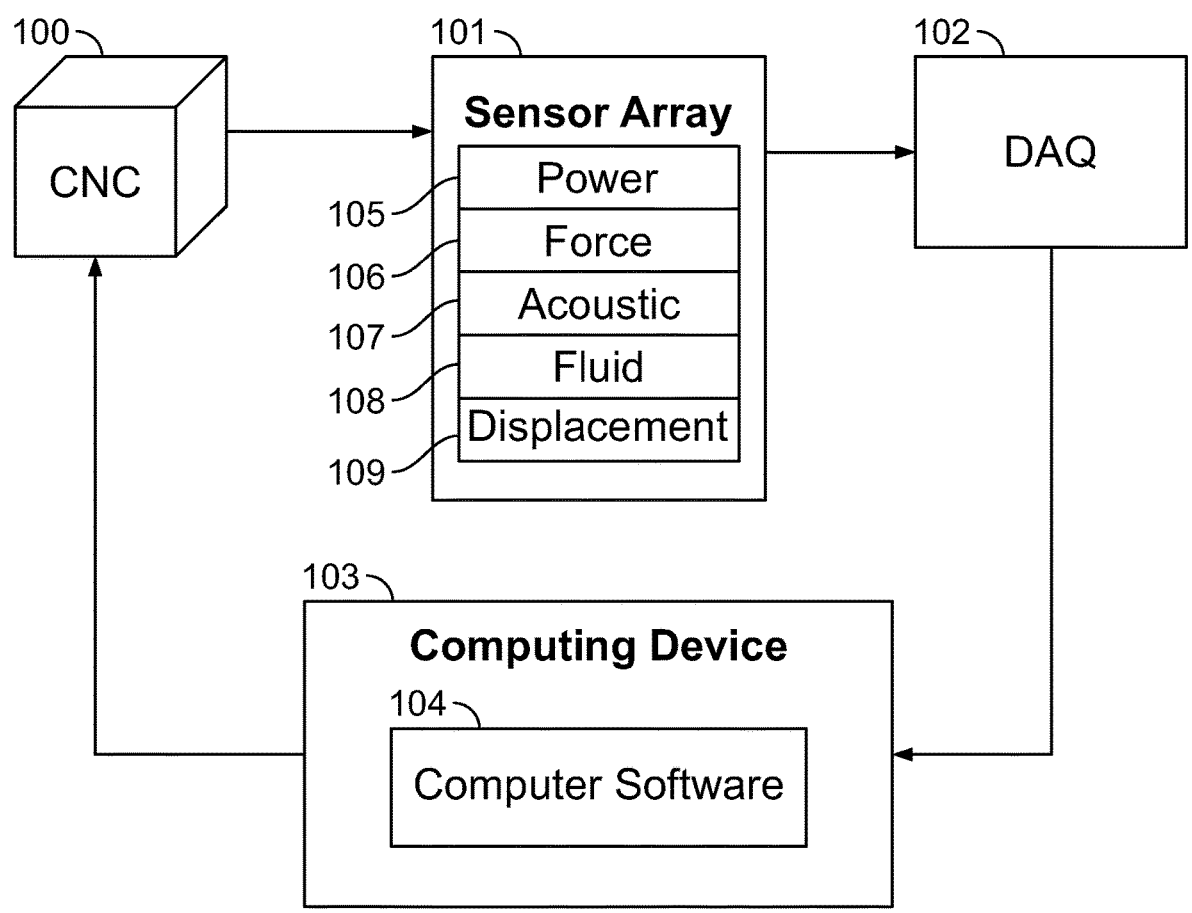

The drawings are not necessarily to scale. In certain instances, details that are not necessary for an understanding of the disclosure or that render other details difficult to perceive may have been omitted. It should be understood, of course, that the disclosure is not necessarily limited to the embodiments illustrated herein.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Grinding Machine Sensing and Measurement System

With reference to FIG. 1, the present invention contemplates a data capturing and measuring system. In some embodiments, the capturing and measuring system is configured to operate in conjunction with a CNC machine 100 and comprises a sensor array 101, a data acquisition system (DAQ) 102, a computing device 103 executing computer software 104. In some embodiments, the sensor array 101 includes one or more sensors, including, for example, a power sensor 105, a force sensor 106, an acoustic sensor 107, a fluid sensor 108, and a displacement sensor 109. The sensors of the sensor array 101 are, in some embodiments, coupled to the machining tool of the CNC machine 100, for example a cutting bit, or grinding or polishing wheel.

In some embodiments, the CNC machine 100 is configured to receive data from the computer software 104 and send data to the sensor array 101 via a data communication link. The sensor array 101 is configured to receive data from the CNC machine 100, and the operation thereof, and send signals to the data acquisition system 102 via a data communication link. The data acquisition system 102 is configured to receive signals from the sensor array 101, translate the signals into digital readable data, and send the readable data to a computing device 103 that is executing computer software 104 via a data communication link. The computer software 104 is configured to receive data from the data acquisition system 103, analyze that data, present the data visually to the user in human-readable format, and send the data to the CNC machine 100 via a data collection link.

As noted, the sensor array 101 can comprise one or more sensors that are configured to detect and output certain operational characteristics of a machining operations. For example, a universal power cell 105, for example a Load Controls, Inc. power cell (Model UPC-E), is attached to each tool spindle to measure horsepower. A force sensor 106, for example a Marposs RS-M10, is used to measure applicable forces on the spindle. An acoustic monitoring system 107, for example a Marposs P1dAE, is used to measure the amplitude or sound pressure levels (or change thereof) inside the CNC machine 100. A fluid sensor 108, for example a Marposs FLS-2, is used to measure fluid flow and fluid pressure, for example, of the machining lubricant provided by the CNC machine 100. A displacement sensor 109, for example a Banner Engineering LE550U laser displacement sensor, is used to measure displacement of the machining tool at the spindle. A data acquisition system 102, for example a National Instruments Data Acquisition and Collection Unit, is used to transfer the sensor array data into computer-readable data and translate that computer-readable data to the computer software 104. A computing device 103, for example a desktop computer, is used to execute the computer software 104. A computer software program 104, for example the Applicant's custom-engineered grinding program, is used to visually present data to the user and, in some embodiments, send control data back to the CNC machine 100 via data communication link. A data communication link can include, for example, ethernet, USB, PCI, Bluetooth, or wireless.

Grinding Machine Sensing and Measurement Method

The sensor array 101 continuously and in real-time monitors and captures the critical energy data for power, force, acoustic emissions, fluid flow, fluid pressure, and displacement detected by the one or more sensors of the sensor array 101. For example, if the acoustic sensor 107 detects a sound level over a predetermined level, this may indicate that the tool (for example, a cutting bit, grinding wheel, polishing wheel, or the like) is malfunctioning, has an inconsistent cutting or abrading surface, or has reached the end of its useful life. Similarly, unexpected drops or increases in spindle horsepower detected by the power 105 or force 106 sensor may indicate performance issues from wear or poor tolerances with the tool (or potentially the target substrate being tooled, ground, or polished). Similarly, interruptions in fluid flow detected from the fluid sensor 108 or high or low displacement levels detected by the displacement sensor 109 can indicate malperformance.

The sensor array 101 sends the critical energy data to a data acquisition system 102 and then the data acquisition system 102 feeds the data to computer software 104 that analyzes and records the measured critical energy data. This allows the user to analyze and detect anomalies in a manufacturing, grinding, or polishing operation both at the discrete level, i.e. for each sensor, and at the global level, i.e. a combination of one or more of the critical energy data points.

Once the CNC machine 100 begins to grind, the sensor array 101 begins to measure the applicable critical energies of power, force, acoustic emissions, fluid flow, fluid pressure, and displacement. The critical energies measured by the sensor array 101 are sent to the data acquisition system 102 via a data communication link. The data acquisition system 102 converts the critical energies measured by the sensor array 101 and converts them into a digital form that can be read by a computer and software. The digital form of the critical energies is sent via data communication to a computing device 103 that is executing the grinding program (software 104). The grinding program analyzes and displays the critical energies in a graph type report to the user. In its basic embodiments, based on the graph form critical energies data the user is able to determine through observation how to proceed with the grinding process and/or whether to repair or replace the tool, or modify the CNC machine programming to account for the detected anomalies.

Figure 2:
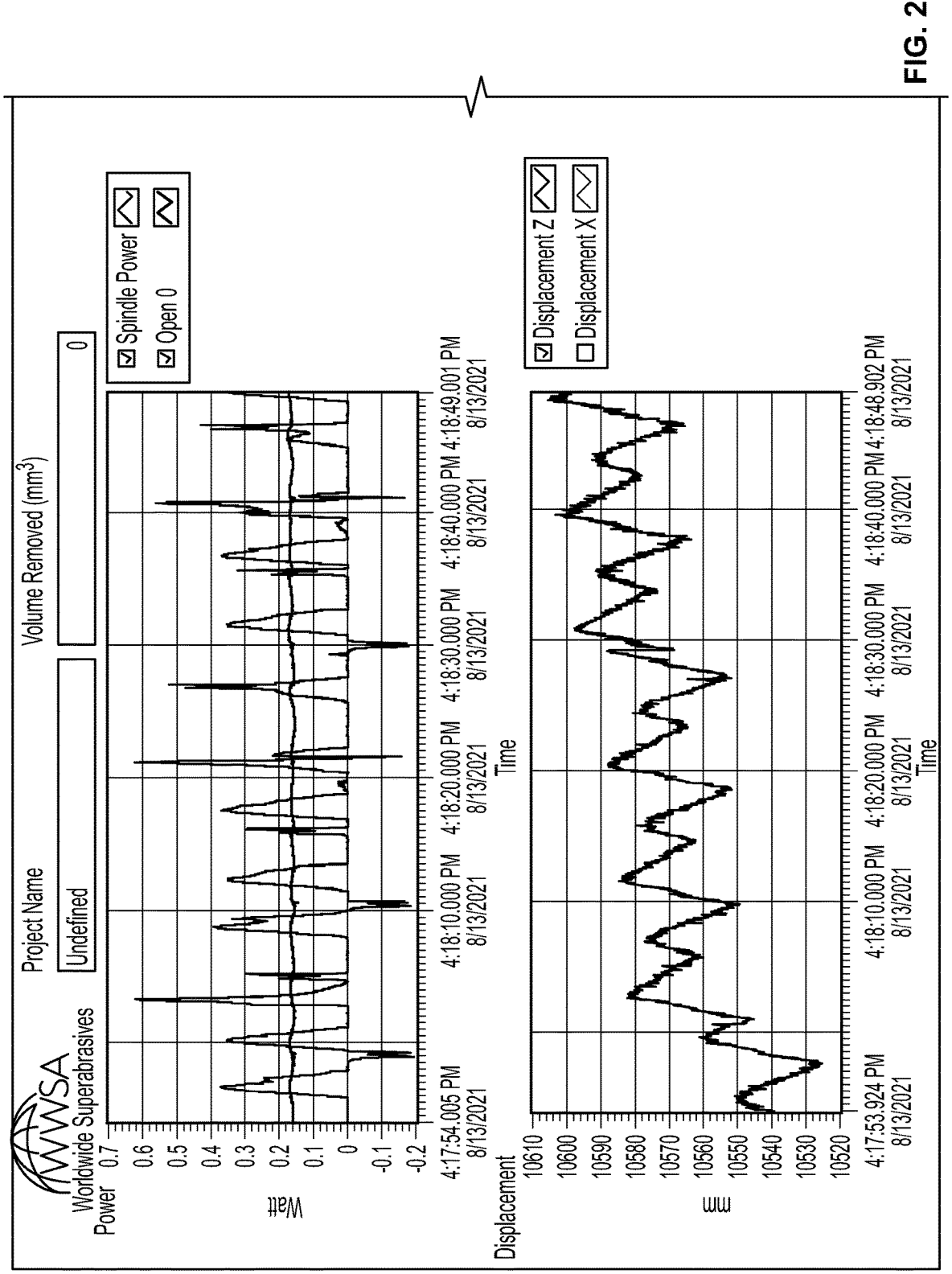
Figure 2:
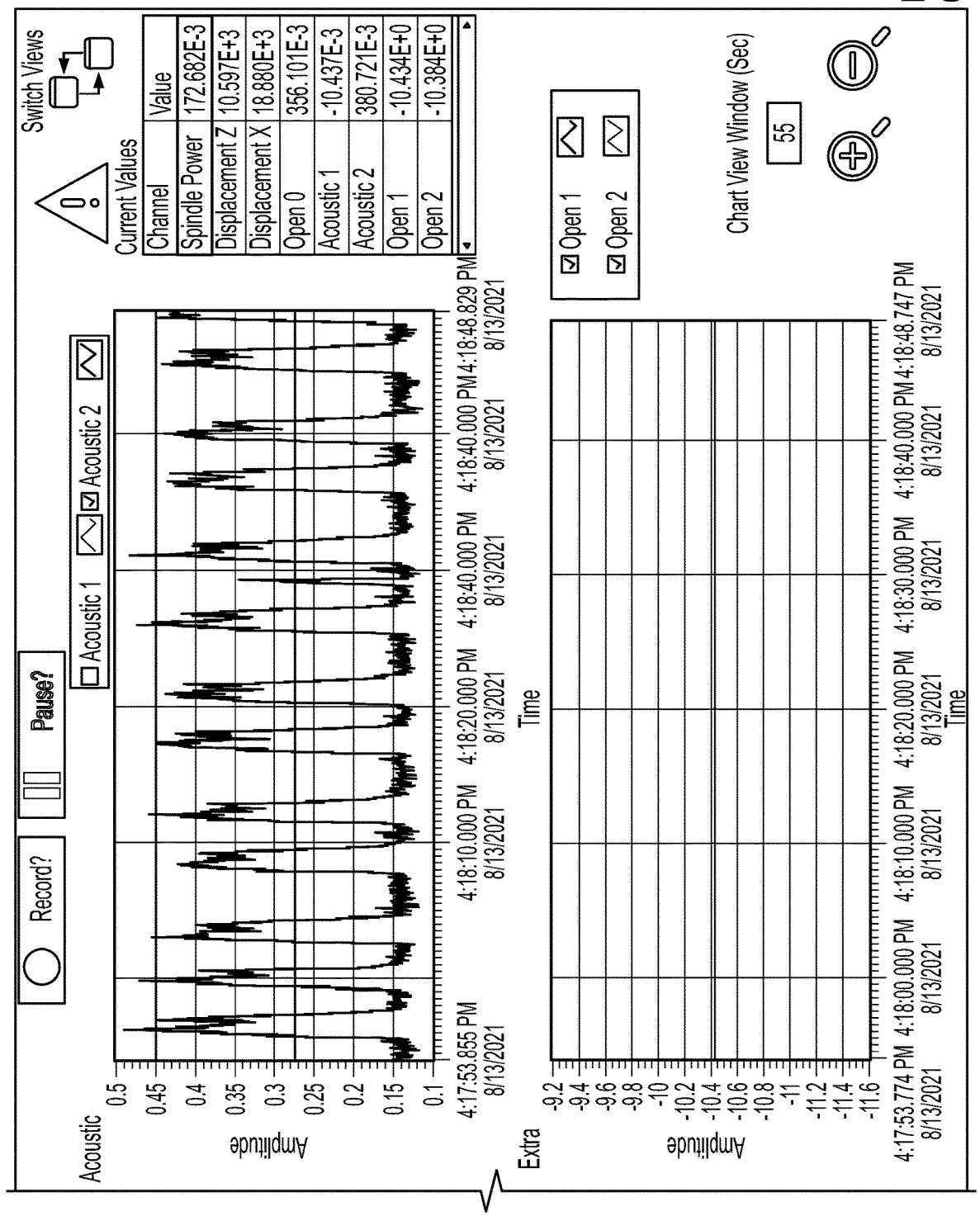

In some embodiments, the computer software 104 is configured to analyze and display up to 8 different scalable channels of data received from data acquisition system 102 in separate windows while displaying real-time a graph type report of the overall grinding or polishing (or manufacturing) operation. For example, with reference to FIG. 2, shown is an example multi-channel configuration that is reading spindle power (via power sensor 105), tool displacement along both Z and X axes (via displacement sensor 109), and two acoustic levels (via acoustic sensor 107) and displays four different graphs demonstrating the performance of the machining operation across the plurality of parameters. The computer software is configured to scale the sensor channels so that a plurality of signals can be read together. The signal data can also be made available, via the computer software, for post-processing in order to integrate changes into the machining program to avoid, address, or mitigate detected anomalies.

Figure 3:
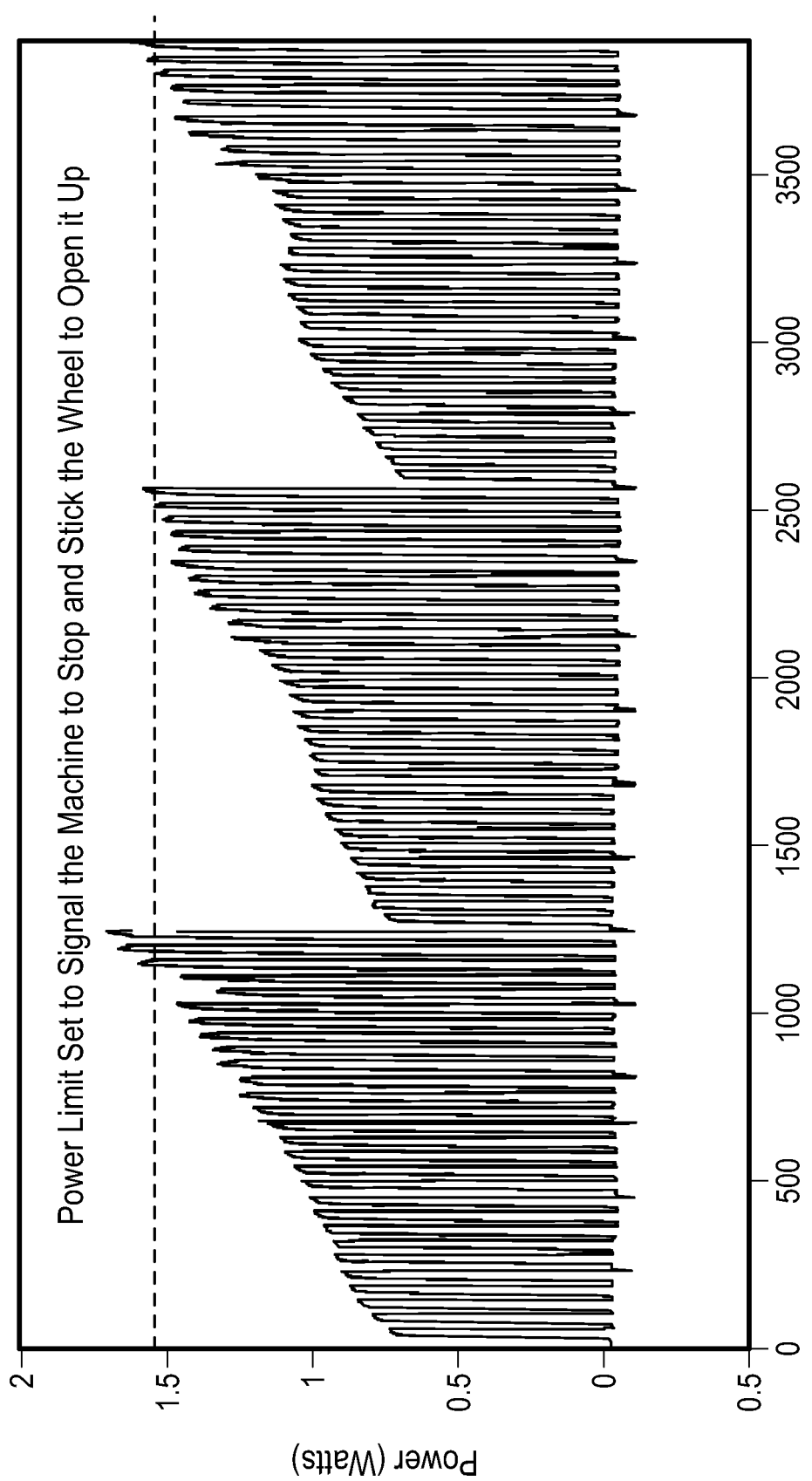

In some embodiments, the computer software 104 can be programmed to allow the user to set predetermined limits at each channel, which predetermined limits may vary depending on the properties of the machining tool use, the underlying substrate, or any discrete or combination of parameters required to meet the desired machining outcome. The data in the program can be post-processed and the program can incorporate a feedback loop back to the CNC machine 100 to correct, modify, or enhance the machining operating once certain parameters have been crossed. For example, with reference to the graph shown in FIG. 3, a predetermined power level is set such that when the power sensor 105 detects power levels at the spindle have reached a predetermined level, the computer program 104 sends a single to the machining tool of the CNC machine 100 to cut or reduce power to prevent an overload or a mistake in the machining operation.

It is appreciated and understood that the system and method can be used to detect irregularities in machining operation that may indicate a problem with the machining program, the cutting/grinding/polishing tool itself, or other factors. In some cases, the system and method can be used to benchmark tool performance by normalizing the machine program and the underlying substrate so that the user can compare various examples of the tool to determine whether a particular tool is functioning to appropriate tolerance or whether there are certain inconsistencies in the tool, either at the outset or that may occur during the machining operation, which require the tool to be repaired or replaced for the machining operating can continue. In this case, the present system and method provides a means to benchmark tool performance to improve tolerances from tool-to-tool and operation-to-operation. It is also appreciated and understood that the output of the software program 104 can be used by the machine operator observationally, i.e. to visually detect an anomaly and manually stop or correct the machining operation or the computer program 104 may include, or can be programmed with, instructions that are sent back to the CNC machine 100 to automatically modify conditions as part (for example by shutting off or slowing down the machining tool) of an feedback loop orchestrated by the software program 104.

Description of Computing Environment

Computing device 103 can include any smart phone, tablet computer, laptop computer, or other computing or mobile device capable of reading, and/or recording data about systems, devices, locations, and/or equipment, etc. Computing device 103 can include any server computer, desktop computer, laptop computer, or other device capable of storing and managing data communication by and between one or more sensors of the sensor array 101 and the DAQ 102.

In some embodiments, the computing device 103 includes processing system, storage system, software, communication interface, and user interface. Processing system loads and executes software, including computer software 104, from storage system, including software module. When executed by computing device 103, software module directs processing system to receive data, images, devices, locations, and/or equipment, etc. Such data could include any of the information described above, including but not limited to the functionality described herein. Additionally, computing device 103 includes communication interface that can be further configured to transmit data to and receive data from computing device 103.

The computing device 103 includes a processing system that can comprise a microprocessor and other circuitry that retrieves and executes software from storage system. Processing system can be implemented within a single processing device but can also be distributed across multiple processing devices or sub-systems that cooperate in executing program instructions. Examples of processing system include general purpose central processing units, application specific processors, and logic devices, as well as any other type of processing device, combinations of processing devices, or variations thereof. Storage system can comprise any storage media readable by processing system, and capable of storing software. Storage system can include volatile and nonvolatile, removable and non-removable media implemented in any method or technology for storage of information, such as computer readable instructions, data structures, program modules, or other data. Storage system can be implemented as a single storage device but may also be implemented across multiple storage devices or sub-systems. Storage system can comprise additional elements, such as a controller, capable of communicating with processing system.

An application interface can include data input and image display. In one example, data input can be used to collect information and data inputs from the user. It should be understood that although computing device 103 is shown as one system, the system can comprise one or more systems to collect data.

Computing device 103 includes processing system, storage system, software, and communication interface. Processing system loads and executes software from storage system, including software module 104. When executed by computing device 103, software module 104 directs processing system to store and manage the data.

The processing system can comprise a microprocessor and other circuitry that retrieves and executes software from storage system. Processing system can be implemented within a single processing device but can also be distributed across multiple processing devices or sub-systems that cooperate in executing program instructions. Examples of processing system include general purpose central processing units, application specific processors, and logic devices, as well as any other type of processing device, combinations of processing devices, or variations thereof.

Storage system can comprise any storage media readable by processing system, and capable of storing software and data from the computing device. Data from computing device may be stored in a word, excel, or any other form of digital file. Storage system can include volatile and nonvolatile, removable and non-removable media implemented in any method or technology for storage of information, such as computer readable instructions, data structures, program modules, or other data. Storage system can be implemented as a single storage device but may also be implemented across multiple storage devices or sub-systems. Storage system can comprise additional elements, such as a controller, capable of communicating with processing system.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. In no case is the storage media a propagated signal.

In some examples, computing device 103 an include a user interface. The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The user input and output devices are well known in the art and need not be discussed at length here.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether such alternate, interchangeable and/or equivalent structures, functions, ranges or steps are disclosed herein, and without intending to publicly dedicate any patentable subject matter.

What is claimed is:

1. A method of mitigating anomalies in a computer numerical control grinding operation, comprising:
   a. providing a sensor array, a data acquisition system, and a computing device, wherein the sensor array comprises a plurality of sensors that detect one or more operating conditions of a machining tool used in the grinding operation, wherein the sensors include a power sensor, a force sensor, an acoustic sensor, a fluid sensor, and a displacement sensor;
   b. establishing a communications link between the sensor array and the computing device by way of the data acquisition system;
   c. executing a machining program associated with the computer numerical control grinding operation;
   d. measuring horsepower applied to the machining tool via the power sensor;
   e. measuring the amplitude of the grinding operation via the acoustic sensor;
   f. measuring fluid flow and fluid pressure of lubricant in the grinding operation via the fluid sensor;
   g. measuring the displacement of the machining tool along at least one axis via the displacement sensor;
   h. receiving, on the data acquisition system, one or more signals corresponding to the sensors;
   i. translating, on the data acquisition system, the one or more signals into readable sensor data associated with each of the sensors;
   j. transmitting, from the data acquisition system to the computing device, the readable sensor data;
   k. scaling the readable sensor data via computer software executing on the computing device so that the readable sensor data associated with each of the sensors can be read together;
   l. comparing the scaled readable sensor data to predetermined limits in order to determine the presence of anomalies in the grinding operation; and
   m. integrating changes in the machining program to mitigate the anomalies.

2. The method of claim 1 wherein the grinding operation comprises a wheel-dressing operation.

3. The method of claim 1, further comprising the step of displaying in human-readable format via the computer software, the scaled readable sensor data associated with each of the sensors in real-time to provide a graphical illustration of the grinding operation.

4. The method of claim 2, further comprising the step of displaying in human-readable format via the computer software, the predetermined limits to provide a graphical illustration of the grinding operation relative to the predetermined limits.

5. The method of claim 1, wherein the sensors are assigned across at least eight (8) channels at the data acquisition system, each channel configurable and scalable with respect to one another.

6. A method of benchmarking performance of a machining tool against predetermined tolerances, comprising:
   a. providing a sensor array, a data acquisition system, and a computing device, wherein the sensor array comprises a plurality of sensors that detect one or more operating conditions of the machining tool used in a computer numerical control grinding operation, wherein the sensors include a power sensor, a force sensor, an acoustic sensor, a fluid sensor, and a displacement sensor;
   b. establishing a communications link between the sensor array and the computing device by way of the data acquisition system;
   c. executing a machining program associated with the computer numerical control grinding operation;
   d. normalizing the machining program;
   e. measuring horsepower applied to the machining tool via the power sensor;
   f. measuring the amplitude of the grinding operation via the acoustic sensor;
   g. measuring fluid flow and fluid pressure of lubricant in the grinding operation via the fluid sensor;
   h. measuring the displacement of the machining tool along at least one axis via the displacement sensor;
   i. receiving, on the data acquisition system, one or more signals corresponding to the sensors;
   j. translating, on the data acquisition system, the one or more signals into readable sensor data associated with each of the sensors;
   k. transmitting, from the data acquisition system to the computing device, the readable sensor data;
   l. scaling the readable sensor data via computer software executing on the computing device so that the readable sensor data associated with each of the sensors can be read together; and
   m. comparing the scaled readable sensor data to predetermined limits associated with the predetermined tolerances in order to determine the presence of inconsistencies in the tool.

7. The method of claim 6 wherein the grinding operation comprises a wheel-dressing operation.

8. The method of claim 6, further comprising the step of displaying in human-readable format via the computer software, the scaled readable sensor data associated with each of the sensors in real-time to provide a graphical illustration of the grinding operation.

9. The method of claim 8, further comprising the step of displaying in human-readable format via the computer software, the predetermined limits associated with the predetermined tolerances to provide a graphical illustration of the grinding operation relative to the predetermined limits associated with the predetermined tolerances.

10. The method of claim 6, wherein the sensors are assigned across at least eight (8) channels at the data acquisition system, each channel configurable and scalable with respect to one another.

* * * * *